United States Patent [19]

Sato et al.

[11] Patent Number: 4,741,523
[45] Date of Patent: May 3, 1988

[54] POSITIONING PIN DEVICE

[75] Inventors: Toshiaki Sato, Kasuga; Fumihiko Nishida, Kyoto, both of Japan

[73] Assignee: Dainippon Screen Mfg. Co., Ltd., Kyoto, Japan

[21] Appl. No.: 921,767

[22] Filed: Oct. 22, 1986

[30] Foreign Application Priority Data

Oct. 24, 1985 [JP] Japan .................... 60-163771[U]
May 6, 1986 [JP] Japan .................... 61-68547[U]

[51] Int. Cl.⁴ .............................................. B23Q 3/18
[52] U.S. Cl. ........................... 269/316; 269/303; 269/317
[58] Field of Search .............. 269/315, 316, 317, 303, 269/900, 289 R, 291, 297, 298, 306

[56] References Cited

U.S. PATENT DOCUMENTS 3,392,761  7/1968  Klein ..................... 269/316
3,860,229  1/1975  Anderson ............... 269/316
3,894,730  7/1975  Reiter ..................... 269/316

FOREIGN PATENT DOCUMENTS 0202742  11/1983  Japan ..................... 269/317

Primary Examiner—Frederick R. Schmidt
Assistant Examiner—Judy J. Hartman
Attorney, Agent, or Firm—Lowe, Price, Leblanc, Becker & Shur

[57] ABSTRACT

A positioning pin device comprises a bush having at least 3 radially bored holes with, a positioning pin extending axially within the bush. The pin is movable in its axial direction and a spring urges the positioning pin toward the upper side of the bush. At least 3 balls are respectively disposed inside the radial holes of the bush. Screws fitted in the bush respectively abut the balls at their tips to provide positioning adjustment.

6 Claims, 2 Drawing Sheets

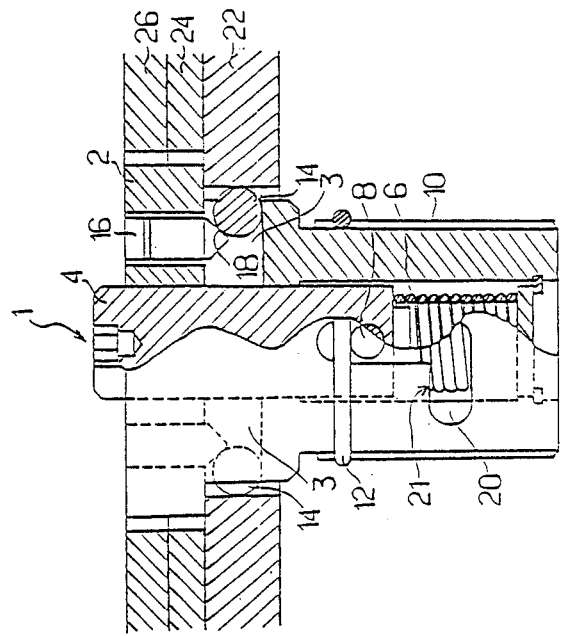
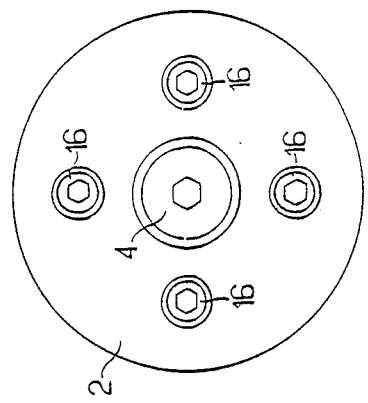
FIG. 1
FIG. 2

POSITIONING PIN DEVICE

BACKGROUND OF THE INVENTION

1. Field of the Invention

The present invention relates to a positioning pin device and more particularly to a positioning pin device for originals or sensitive materials used in a graphic arts device such as composer for use in a photomechanical process.

2. Description of the Prior Art

A positioning pin used in a graphic arts device, which is required to be arranged accurately at a fixed position, needs to be so composed as to allow delicate adjustment about its position.

In a positioning pin device hithereto known, such as one disclosed in U.S. Pat. No. 3,860,229, a positioning pin which is radially movable is arranged in a housing, and a guide having a tapered part is arranged along the circumference of the positioning pin downward thereof such that the tapered part of the guide is pressed by means of a plurality of screws screwed in the housing, thereby adjusting radially a position of the pin in the housing.

The positioning pin device disclosed in said U.S. Pat. No. 3,860,229 not only requires an increased number of parts, but involves the following problems. That is, in the positioning pin device disclosed in said publication, since the movement of the positioning pin in the radial direction is controlled only by the guide arranged along its bottom circumference, an error several times as large as the manufacturing error between the OD of the positioning pin and the ID of the guide is produced at the top of the positioning pin where the sensitive materials, etc. to be actually subjected to the positioning are mounted, thus detracting from highly accurate positioning.

Moreover, the positioning pin device of said publication is of a construction such that the housing is installed by thrusting it into the base plate; therefore, a hole having an inner diameter equal to an outer diameter of the housing needs to be bored in the base plate. But it is difficult to bore such a hole with the correct inner diameter and perpendicular to the base plate and if the inner diameter of the hole is even a little larger than the outer diameter of the housing, the positional accuracy of the positioning pin will be affected due to such error.

SUMMARY OF THE INVENTION

Accordingly, an object of this invention is to provide means for solving the above-discussed problems, i.e., a positioning pin device comprising a bush with at least 3 holes radially bored opening at its sides, a positioning pin arranged in this bush and movable axially, a spring for urging this positioning pin toward the upper side of the aforementioned bush, at least 3 balls respectively disposed in each hole of the aforementioned bush and facing to the openings at a side of the bush, and screws to be screwed in the aforementioned bush for engagement therewith and to abut on the aforementioned balls at their tips.

By adjusting the screws to be engaged with the bush, the balls are moved in the holes of the bush, thereby letting them go out or come in through the opening at a side of the bush, so that the relative positions of the bush to respective balls may be changed, thus allowing the position of the positioning pin, together with that of the bush, to be adjusted in the radial directions.

Arranged as above described, the positioning pin device according to this invention not only can afford exact adjustment of the positioning pin position in spite of its very simple construction, but permits rough finish or low machining accuracy of the hole part of the base plate for mounting the positioning pin device.

BRIEF DESCRIPTION OF THE DRAWINGS

FIGS. 1 and 2 illustrate an embodiment of this invention, wherein

FIG. 1 is a partially sectional view of a positioning device;

FIGS. 2 is its top view;

FIG. 4 its view showing a section taken along the line IV - IV' in FIG. 3 together with a base plate, etc.

DESCRIPTION OF THE PREFERRED EMBODIMENTS

Figure 4:
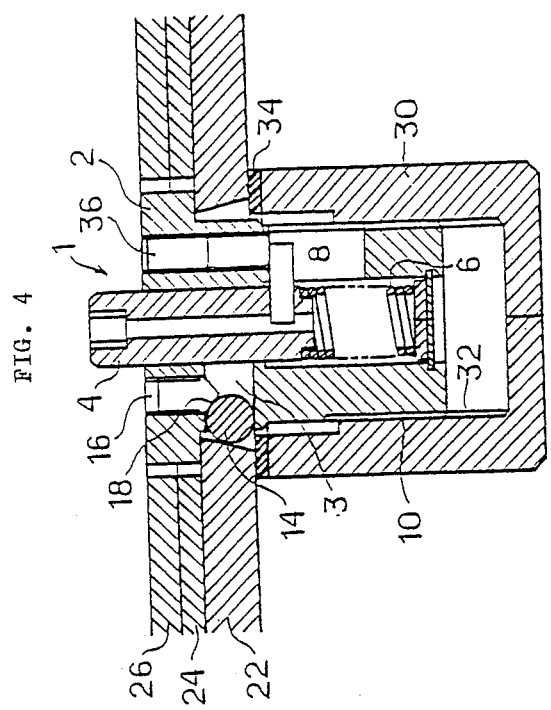
FIGS. 3 and 4 illustrate another embodiment of this invention, and wherein FIG. 3 being a top view of another positioning pin device.

Referring now to the accompanying drawings, several embodiments according to the invention is described in detail hereunder.

In FIGS. 1 and 2 showing a partially sectional view of a positioning device, and its top view, reference numeral 22 denotes a metal base plate on which the positioning pin device is mounted, 24 is an aluminum intermediary plate, and 26 is a resin surface plate. Numeral 2 denotes a bush, inside which a positioning pin 4 is vertically movably arranged. The positioning pin 4 is not only urged by a spring 6 toward the upper side of the bush 2, but its position is controlled by abutting a roll pin 8 inserted in the positioning pin on a stop member 12. The stop member 12 is engaged with the screwed part 10 of the bush 2 and it is possible to arbitrarily alter the level of the positioning pin 4 relative to the bush 2 by adjusting the position of the stop member 12. And the positioning pin 4 is so arranged as to go at least to the same level as the top of the bush 2 being urged upward by the spring 6, when a load is imposed on the upper side of the pin 4.

In the bush 2, four holes 3 are radially bored at angular intervals of 90°, the holes 3 opening at both sides of the bush 2. In each hole 3, a steel ball 14 is respectively disposed, each steel ball 14 facing to an opening of the hole at one side of the bush 2 and abutting on a tapered part 18 of each of 4 screws screw-fitted in the bush 2. The position of each ball 14 relative to the bush 2 may be arbitrarily altered by adjusting a screw 16. Numeral 20 designates a L-shape notched portion in bush 2. When not in use, the positioning pin 4 may be fully brought down inside the bush 2 by engaging the roll pin 8 with a face 21 of the notch 20 by turning the positioning pin 4 in the state of being thrusted into the bush 2.

When mounting the above-described positioning pin device 1 on the base plate 22, the positioning pin device 1 is inserted into the hole of the base plate 22, after loosening each screw 16. Then the balls 14 are pushed to the outside by the tapered part 18 of each screw 16 by tightening it, to let the balls 14 project from the circumferencial surface of the bush 2, thereby securing the positioning pin device 1 on the base plate 22.

Delicate adjustment of the position of the positioning pin 4 is made by tightening one or two of the screws 16, after loosening the other one or two screws, thereby moving the positioning pin 4, together with the bush 22, in the horizontal direction relative to the balls 14, i.e., the base plate 22.

Figure 3:
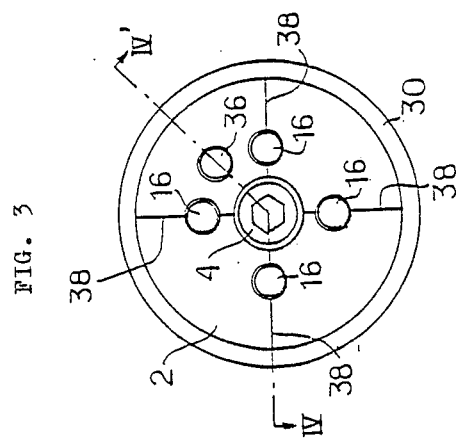

FIGS. 3 and 4 represent another embodiment of this invention, FIG. 3 being a top view of the positioning pin device, and FIG. 4 a sectional view taken along the line IV - IV' of FIG. 3 together with the base plate, etc., like parts designated by like reference numerals as in FIGS. 1 and 2 indicate the same members as those of the foregoing embodiment. In the device of this embodiment, an air-tight container 30 is provided surrounding the lower part of the bush 2. This air-tight container 30 has its screwed part 32 which is tapped on its internal circumferential surface engaged with the screwed part 10 of the outer circumferential surface of the bush 2 and its top surface air-tightly press-fitted on the bottom surface of the base plate 22 through a packing 34. By adopting such construction, such situation as reduction of vacuum degree due to infiltration of air through the mounting portion of the positioning pin can be prevented, even if the positioning pin is placed inside a vacuum printing frame in making close vacuum contact between a plate and a sensitive material on the surface plate 26, when the printing is made by use of a printing device.

Next, in order to allow the level adjustment of the positioning pin 4 relative to the bush 2 to be made from the surface plate 26 side, a screw 36 screw-fitted in the bush 2 is provided in place of the stop member 12 in the embodiment device of FIGS. 1 and 2. Thus by adjusting the screwing amount of this screw 36, the roll pin 8 is pushed down by the tip of the screw 36 against the elastic rebounding force of the spring 6, thereby enabling the level of the positioning pin 4 in which the roll pin 8 is inserted to be arbitrarily altered. Besides, by arranging adjusting means on the surface plate 26 side, it becomes possible to screw-fit the aforementioned air-tight container 30 on the screwed part 10 of the bush 2. Furthermore, in this embodiment device, for the purpose of easy and correct positioning and mounting of the positioning pin device on the base plate 22, cross shape marking-off lines 38 are engraved or drawn on the upper surface of the bush 2. Describing in detail the process of mounting the positioning pin device 1 on the base plate 22, before boring a hole for mounting the positioning pin device 1 in the base plate 22, a photosensitive material is pasted up on the surface of a surface-plate 26. Then after printing a cross line at a desired position on the aforementioned photosensitive material by a composer, the surface-plate 26 on which the sensitive material is pasted up is subjected to developing treatment. And the mounting hole is bored into the base plate 22, etc., in register with the crossline, and into this mounting hole, the positioning pin device is inserted to be mounted thereon. At this time, the positioning pin device 1 needs to be located at the center of the mounting hole of the base plate 22, but since parts of the crosslined are left on the surface of the surface plate 26 around the mounting hole, the positioning pin device 1 will become correctly and easily positioned and mounted by aligning these parts of the cross lines with the marking-off lines 38 on the top surface of the bush 2.

It should be noted that in the embodiment of FIGS. 1 and 2, the position of the positioning pin device 1 relative to the hole of the base plate 22 is adjusted by turning the screws 16, when mounting the positioning pin device 1 on the base plate 22. But in making such adjustment, if the hole of the base plate 22 has an invertedly conical tapered surface, the positioning pin device 1 sometimes is projected upward. In order to avert such situation, the hole of the base plate 22 is desired to have a conical tapered surface spreading downward, as shown in FIG. 4.

We claim:

1. A positioning pin device adapted to engage within a hole formed in a base plate, comprising a bush having at least 3 holes radially bored within the bush, a positioning pin arranged within the bush to be movable in an axial direction, a spring urging said positioning pin toward an upper side of said bush, at least 3 balls, each respectively disposed in one of said holes and within openings formed in sides of the bush, and screws extending in said bush, said screws having tips, each formed with an inclined face against which associated balls abut for urging said balls against walls forming the hole in the plate, said screws being longitudinally adjustable to radially displace the balls relative to the longitudinally axis of the bush to thereby radially displace the positioning pin in the base plate hole said bush having an outer diameter which is smaller than an inner diameter of said base plate hole in which the pin is mounted to generally define an annular space between the hole and the bush.

2. The pin device of claim 1, wherein said positioning pin includes roll pin means engageable with stop means on the bushing to control the extent to which an upper end of the positioning pin protrudes above the base plate.

3. The pin device of claim 2, wherein said stop means includes a stop member secured to a threaded portion of the bush.

4. The pin device of claim 2, wherein said stop means includes a screw means having a lower end defining a stop surface against which the roll pin means abuts under the bias of the spring.

5. The pin device of claim 1, further including an air tight container engageable with a lower end of the bush.

6. The pin device of claim 5, further including packing means engageable with an underside of the base plate and the air tight container to provide an air tight seal.

* * * * *